United States Patent
Schneider et al.

(10) Patent No.: US 12,030,261 B2
(45) Date of Patent: Jul. 9, 2024

(54) TURBOMACHINE COMPONENT COMPRISING A FIBROUS PREFORM

(71) Applicant: SAFRAN AIRCRAFT ENGINES, Paris (FR)

(72) Inventors: Julien Schneider, Moissy-Cramayel (FR); Yanneck Wielhorski, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 440 days.

(21) Appl. No.: 17/299,605

(22) PCT Filed: Dec. 2, 2019

(86) PCT No.: PCT/FR2019/052872
§ 371 (c)(1),
(2) Date: Jun. 3, 2021

(87) PCT Pub. No.: WO2020/120869
PCT Pub. Date: Jun. 18, 2020

(65) Prior Publication Data
US 2022/0016855 A1    Jan. 20, 2022

(30) Foreign Application Priority Data

Dec. 13, 2018    (FR) ...................... 1872821

(51) Int. Cl.
*B29C 70/24* (2006.01)
*B29K 307/04* (2006.01)
*B29L 31/00* (2006.01)
*B29L 31/08* (2006.01)

(52) U.S. Cl.
CPC .......... *B29C 70/24* (2013.01); *B29K 2307/04* (2013.01); *B29L 2031/082* (2013.01); *B29L 2031/748* (2013.01)

(58) Field of Classification Search
CPC ......... B29B 11/16; B29C 70/24; B29C 70/42; B29K 2307/04; B29L 2031/082;
(Continued)

(56) References Cited

U.S. PATENT DOCUMENTS

| | | | |
|---|---|---|---|
| 4,776,865 | A | 10/1988 | Allaire |
| 2004/0072490 | A1 | 4/2004 | Healy |

(Continued)

FOREIGN PATENT DOCUMENTS

| | | | |
|---|---|---|---|
| CA | 1 274 075 A | 9/1990 | |
| CN | 108430746 A | 8/2018 | |

(Continued)

OTHER PUBLICATIONS

International Search Report as issued in International Patent Application No. PCT/FR2019/052872, dated May 26, 2020.

(Continued)

*Primary Examiner* — Camie S Thompson
(74) *Attorney, Agent, or Firm* — Pillsbury Winthrop Shaw Pittman LLP

(57) ABSTRACT

A fibrous preform of a turbomachine component has a three-dimensional weave formed by a plurality of woven strands, wherein, in a shear plane of the component, all or part of the strands present in this plane have fibers forming an angle between 10° and 50° with their centerline.

11 Claims, 4 Drawing Sheets

(58) Field of Classification Search
CPC .... B29L 2031/748; F01D 5/282; F01D 5/147; F01D 5/30; F01D 5/28; F05D 2230/30; F05D 2230/31; F05D 2300/603; F05D 2240/30
USPC ........ 416/230; 156/148; 442/205; 428/297.4
See application file for complete search history.

(56) References Cited

U.S. PATENT DOCUMENTS

| | | |
|---|---|---|
| 2011/0311368 A1 | 12/2011 | Coupe et al. |
| 2015/0315920 A1* | 11/2015 | Illand ................. B29D 99/0025 416/230 |
| 2018/0119550 A1 | 5/2018 | Berdou et al. |
| 2020/0271015 A1 | 8/2020 | Fabre et al. |

FOREIGN PATENT DOCUMENTS

| | | |
|---|---|---|
| EP | 3 006 611 A1 | 4/2016 |
| WO | WO 2014/196432 A1 | 12/2014 |
| WO | WO 2018/130857 A1 | 7/2018 |

OTHER PUBLICATIONS

Shah, D. U., et al., "Modelling the effect of yarn twist on the tensile strength of unidirectional plant fibre yarn composites," Journal of Composite Materials, vol. 47, No. 4, Mar. 2012, pp. 425-436.

"Glossary of Terms," In: "Composites," Dec. 2001, ASM International, pp. 1113-1136.

Naik, N. K., et al., "Twister impregnated yarns: Elastic properties," The Journal of Strain Analysis for Engineering Design, vol. 35, No. 2, Feb. 2000, pp. 83-91.

* cited by examiner

[Fig. 1]
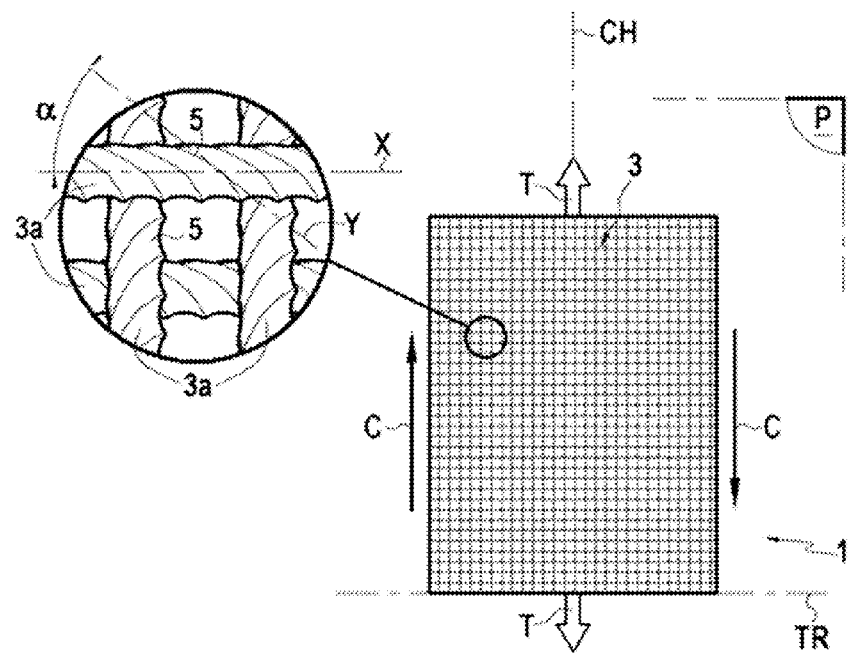
[Fig. 2]
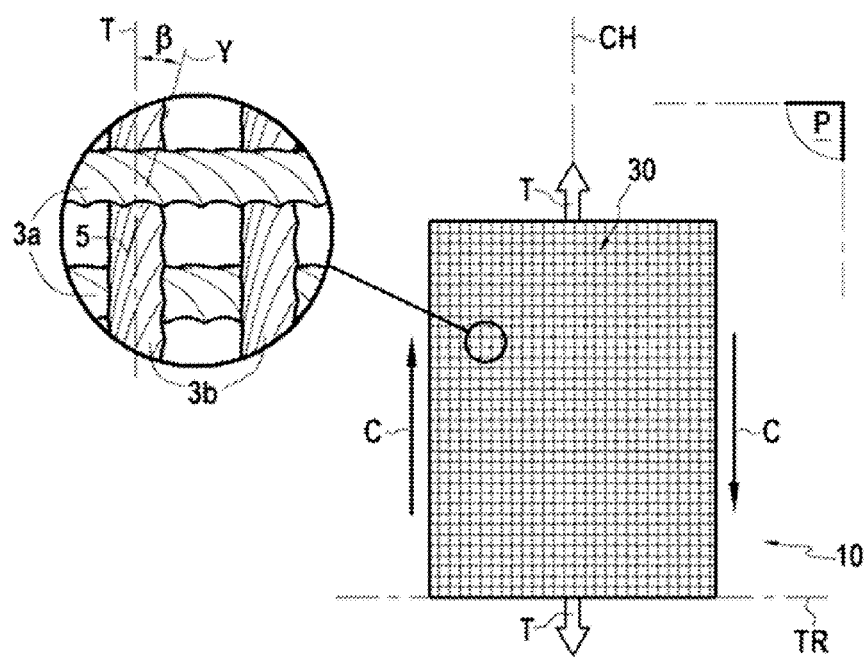

[Fig. 3]
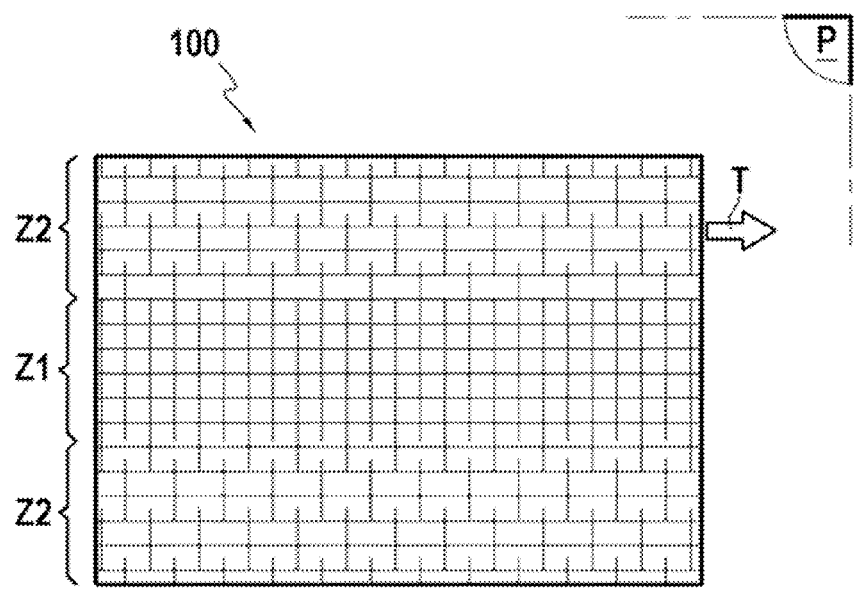
[Fig. 4]
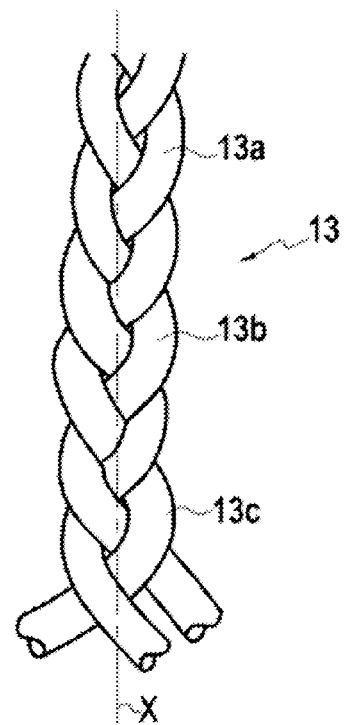

[Fig. 5]
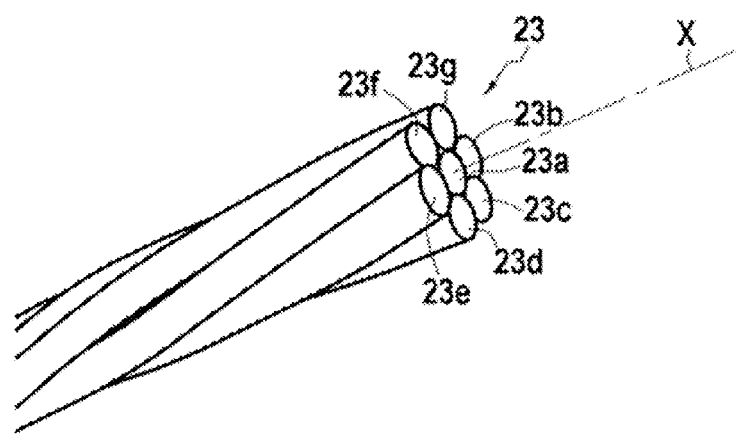
[Fig. 6]
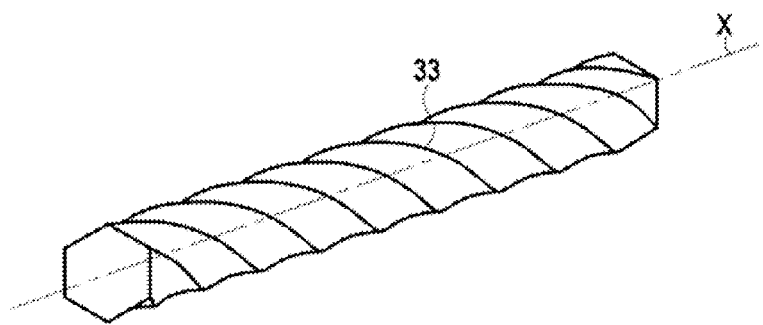

[Fig. 7]
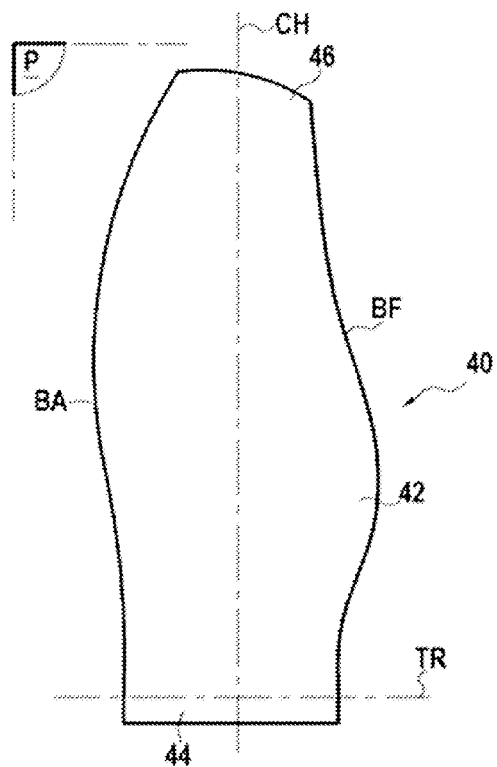
[Fig. 8]
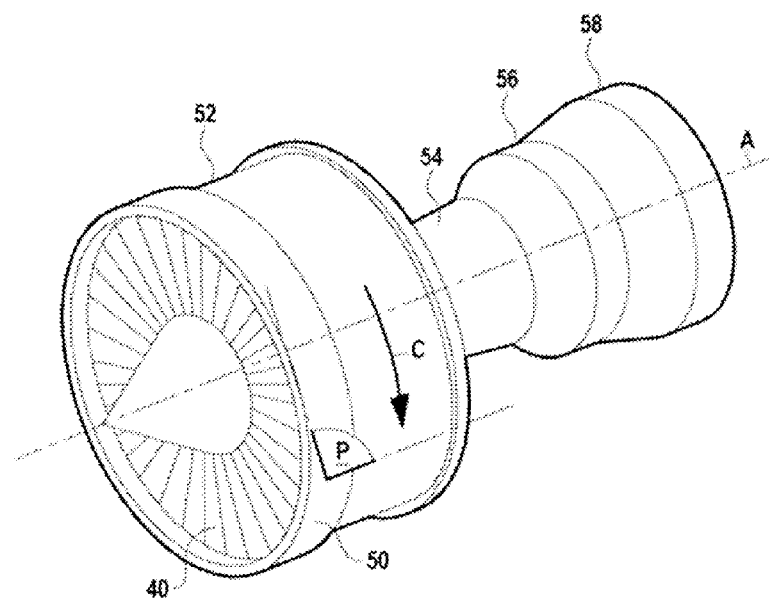

TURBOMACHINE COMPONENT COMPRISING A FIBROUS PREFORM

CROSS-REFERENCE TO RELATED APPLICATIONS

This application is the U.S. National Stage of PCT/FR2019/052872, filed Dec. 2, 2019, which in turn claims priority to French patent application number 1872821 filed Dec. 13, 2018. The content of these applications are incorporated herein by reference in their entireties.

TECHNICAL FIELD

The present invention relates to a fibrous preform of a turbomachine component made of composite material having a three-dimensional weave formed by a plurality of woven strands which have fibers oriented in a particular manner with respect to their centerline.

PRIOR ART

In the field of woven fiber reinforced composite components, the strands used for weaving are usually oriented in preferred directions in order to obtain the desired strength properties. For example, in order to provide strength under uniaxial tensile stress, one of the weaving directions is oriented collinearly with this stress direction.

If the aim is to provide the part with shear strength, then it is necessary to orient the strands differently. Such a change in strand orientation to improve shear strength can lead to a significant reduction in tensile strength.

Also known are US 2018/0119550 which discloses a blade provided with platforms having a stiffener and US 2011/0311368 which discloses a composite turbomachine blade and process for manufacturing same.

It remains desirable to improve the shear strength of turbomachine components. In particular, it remains desirable to have turbomachine components that have improved shear strength without excessively affecting the tensile strength.

DISCLOSURE OF THE INVENTION

According to a first aspect, the aim of the present invention is a fibrous preform of a turbomachine component having a three-dimensional weave formed by a plurality of woven strands,
the preform being characterized in that, in a shear plane of the component, all or part of the strands present in this plane have fibers forming an angle comprised between 10° and 50° with their centerline.

The centerline of a strand corresponds to its direction of elongation. It is defined by the line that joins all the barycenters of the cross-sections of the strand.

The shear plane is the plane in which shear forces are exerted. For a given turbomachine component, the person skilled in the art knows how to identify the shear plane insofar as he or she knows the location and function of the component in the turbomachine and therefore the stresses to which it is subjected.

The invention is based on changing the angles that the fibers make within the strands present in the shear plane rather than changing the orientations of the strands in the preform. The inventors have found that orienting the fibers within the strands as described above advantageously improves the shear strength of the component. This solution has the advantage of not affecting the orientations of the weave strands and therefore, in particular, of avoiding an excessive affect on the tensile strength of the component.

In an example embodiment, said angle is comprised between 30° and 50°.

Such an orientation of the fibers advantageously further improves the shear strength of the turbomachine component.

This angle is for example comprised between 40° and 50° or between 30° and 45° and is for example substantially equal to 45°.

In an example embodiment, the preform comprises strands present in said shear plane and extending along a tensile stress direction of the component, said strands having fibers forming an angle less than or equal to 15° with said tensile stress direction.

As for the shear plane, the person skilled in the art is able to identify on the fibrous preform a tensile stress direction of the component. The tensile stress direction can be the warp or weft direction.

Such a feature advantageously optimizes the tensile strength of the component by bringing the fibers closer to the tensile stress direction.

In particular, strands whose fibers are oriented with respect to the centerline as indicated above can additionally verify this fiber orientation condition along the tensile stress direction. Alternatively, strands other than those whose fibers are oriented with respect to the centerline as described above may verify this fiber orientation condition along the tensile stress direction.

In an example embodiment, there is, in a first zone of said shear plane, a first set of warp strands, respectively weft strands, which have fibers forming a first angle comprised between 10° and 50° with their centerline, and wherein there is, in a second zone of said shear plane different from the first, a second set of warp strands, respectively weft strands, which have fibers forming a second angle with their centerline, said second angle being different from said first angle.

In this example, the orientation of the fibers with respect to the centerline varies as a function of position in the fibrous preform. Such an example makes it possible to design the component in an optimized manner when the aim is to withstand different types of mechanical stresses at different locations in the component.

In an example embodiment, said shear plane corresponds to the plane defined by the warp and weft directions of the three-dimensional weave. The shear plane depends on the turbomachine component considered. Other examples are possible, the shear plane can for example correspond to the plane defined by the warp direction and the thickness direction of the three-dimensional weave, or to the plane defined by the weft direction and the thickness direction of the three-dimensional weave.

In an example embodiment, the woven strands consist of a braid of elementary strands. Other examples are possible, as will be discussed below. In particular, the strands that can be used can be obtained by twisting or twining or by a combination of these different methods.

In an example embodiment, the woven strands are formed of carbon fibers or of fibers of a ceramic material different from carbon. In the case of fibers of a ceramic material different from carbon, the strands may be formed of fibers of a carbide or an oxide. In particular, the fibers may be of silicon carbide or of alumina. The woven strands may also be formed of glass fibers or polymeric fibers.

In an example embodiment, the preform is a turbomachine blade preform. The preform may be a rotor blade or stator vane preform. The preform may be a fan blade or turbine blade preform.

In an example embodiment, the preform is a turbomachine casing preform. The preform may be a fan casing preform, an intermediate casing preform, or an exhaust casing preform.

The preform can also be a turbine or distributor ring sector preform.

The invention further relates to a turbomachine component made of composite material comprising a fibrous reinforcement formed by a fibrous preform as described above, and a matrix densifying the fibrous reinforcement. The component may be an aircraft turbomachine component.

The invention further relates to a process for manufacturing a fibrous preform as described above, comprising at least:
- obtaining a plurality of strands by giving the constituent fibers of each strand an angle comprised between 10° and 50° with the centerline of said strand, and
- three-dimensional weaving of the preform using the strands thus obtained.

In an example embodiment, the strands are obtained by at least one of: braiding elementary strands, twisting elementary strands or twisting fiber bundles. These methods can be combined to obtain the strands to be woven and thus for example twisted elementary strands or braided elementary strands. By way of example, the fiber volume rate of the strands used in the weaving can be comprised between 40% and 85%, for example between 50% and 75%.

BRIEF DESCRIPTION OF THE DRAWINGS

FIG. 1 schematically and partially illustrates an example of a fibrous preform according to the invention, FIG. 2 schematically and partially illustrates an alternative fibrous preform according to the invention, FIG. 3 schematically and partially illustrates another alternative fibrous preform according to the invention, FIG. 4 schematically illustrates an example of a strand that can be used in the context of the invention, FIG. 5 schematically illustrates an alternative strand that can be used in the context of the invention, FIG. 6 schematically illustrates another alternative strand that can be used in the context of the invention, FIG. 7 illustrates a fan blade according to the invention, and FIG. 8 illustrates a turbomachine casing according to the invention.

DESCRIPTION OF THE EMBODIMENTS

FIG. 1 schematically illustrates an example of a preform 1 according to the invention. The fibrous preform 1 is formed by a three-dimensional weave 3 of a plurality of strands 3a. Each strand 3a is formed by a plurality of fibers 5 integral with each other. These fibers 5 are oriented in a particular way with respect to the centerline X of each of the strands 3a. "Three-dimensional weaving" or "3D weaving" is understood to mean a weaving method by which at least some of the weft strands interlink warp strands on several layers of warp strands or vice versa. A reversal of roles between warp and weft is possible in the present text and should also be considered as covered by the claims. The fibrous preform may have an interlock weave. As used herein, "interlock" weave means a weave pattern in which each layer of weft strands interlinks several layers of warp strands, with all of the strands in a single weft column having the same movement in the weave plane. Other weave patterns are conceivable. The fibrous preform 1 can be formed by a single fabric corresponding to the 3D weave. Thus, no additional texture connected to the 3D weave may be used to form the fibrous preform 1.

The shear plane P corresponds to the plane shown in FIG. 1 (sheet plane) and is defined by the warp CH and weft TR directions. The shear plane P contains the directions of application of the shear forces, which are represented by the arrows C in FIG. 1. The weave 3 comprises strands 3a extending in the warp direction CH as well as strands 3a extending in the weft direction TR which are orthogonal to the strands 3a extending in the warp direction CH. In the example shown, the weave 3 comprises strands collinear to the directions C of application of the shear forces and strands orthogonal to these directions C.

In the example shown in FIG. 1, all of the strands 3a present in the shear plane P have the same fiber orientation with respect to their centerline X. In this example, the constituent fibers 5 of each warp or weft strand 3a extend along a direction, represented by the axis Y for the weft strands in FIG. 1, which forms an angle denoted α comprised between 10° and 50° with the mean direction X of said strand. This angle α may for example be comprised between 30° and 50° and may for example be substantially equal to 45°. Also shown in FIG. 1 is a tensile stress direction marked by the arrow T. In the illustrated example and in order to optimize the tensile strength properties, a part of the strands (here the warp strands) is collinear to the tensile stress direction T. The other part of the strands (here the weft strands) is orthogonal to the tensile stress direction T.

In the example just described in connection with FIG. 1, both the warp strands and the weft strands have fibers 5 forming an angle comprised between 10° and 50° with their centerline X. In the example of FIG. 1, the angle formed by the fibers with respect to the centerline is the same for the warp strands as for the weft strands.

FIG. 2 schematically and partially illustrates an alternative fibrous preform 10 according to the invention which differs from the example illustrated in FIG. 1 in that the fibers of the weft strands 3a are oriented differently with respect to the centerline than the fibers of the warp strands 3b.

In the weave 30 of FIG. 2, the warp strands 3b have fibers 5 forming an angle β less than or equal to 15° with the tensile stress direction T, which is here directed along the warp direction CH. The angle β may be less than or equal to 10° and for example comprised between 5° and 10°. At least 10%, for example at least 25%, for example at least 50%, for example at least 75%, for example all of the warp strands 3b may have fibers forming an angle β less than or equal to 15° with the tensile stress direction T.

In this configuration, the fibers of the weft strands 3a form an angle comprised between 10° and 50° with the centerline of the weft strands 3a and thus improve the shear strength of the component. Furthermore, in this configuration, the fibers of the warp strands 3b are close to the tensile stress direction T so as to optimize the tensile strength of the component. Such a configuration thus provides good shear strength while optimizing the tensile strength.

In the examples just described in connection with FIGS. 1 and 2, the angle formed by the fibers in the warp strands is uniform throughout the shear plane P and the angle formed by the fibers in the weft strands is uniform throughout the shear plane P. An alternative embodiment will now be described in which the angle of the fibers in the warp or weft strands varies as a function of position in the fibrous preform.

FIG. 3 illustrates an alternative fiber preform 100 for which the shear plane P has different zones that have strands with fibers oriented differently with respect to their centerline. More particularly in the illustrated example, the shear plane P includes a first zone Z1 that has a first set of warp strands having fibers at a first angle comprised between 10° and 50° to their centerline. The shear plane P further comprises second zones Z2 which have a second set of warp strands having fibers forming a second angle different from the first angle with their centerline. The first zone Z1 is, in the illustrated example, located between the two second zones Z2.

The first Z1 and second Z2 zones may for example be staggered along the thickness of the fibrous preform 100. The second Z2 zones may, for example, have warp strands with fibers close to the tensile stress direction T. According to this example, the warp strands in the first zone Z1 help improve the shear strength and the warp strands in the second zone Z2 help improve the tensile strength. Such a configuration can be of interest in the case of a component subjected to bending, coupled with torsion. The core of the material, marked by the first zone Z1, is very resistant to shearing by orienting the fibers inside the strands in the manner indicated above with respect to the centerline. The skins, marked by the second zones Z2, are in turn very resistant to traction, which is necessary for bending, by orienting the fibers inside the strands in such a way as to minimize the angle that the latter make with the tensile stress direction T.

Other alternatives are possible with respect to the non-limiting examples shown in FIGS. 1 to 3. For example, FIG. 2 could be modified by retaining the fiber orientation in the weft strands 3a but using for the warp strands 3b fiber bundles whose fibers are collinear to the direction T (angle β=0°). Therefore, it is possible to have fibers oriented within the strands only for the weft strands (or alternatively warp strands).

Various possibilities for the orientation of the strand fibers within the fibrous preform have been described. Various types of strands that can be used in the context of the invention in which the fibers are inclined with respect to the centerline X will now be described.

The strands used in the 3D weave can be braided. This possibility is illustrated in FIG. 4, which schematizes a strand 13 formed by a braid of elementary strands 13a-13c. A strand 13 formed by braiding three elementary strands 13a-13c has been shown, but it is not beyond the scope of the invention if the strand is formed by braiding a different number of elementary strands. In the case of braiding, the elementary strands 13a-13c are interwoven with each other to constitute the strand 13 intended to be woven to form the fibrous preform.

In the alternative shown in FIG. 5, the strands 23 may be prepared by twisting elementary strands 23a-23g. As in the case of braiding, the number of elementary strands twisted may vary and is not limited to the example shown. The twisting results in a helical assembly of the elementary strands 23a-23g to form the strand 23 intended to be woven to form the fibrous preform.

In another alternative as shown in FIG. 6, the strands 33 may be prepared by twisting a bundle of fibers. In this case, a single fiber bundle is twisted about its centerline X to give the fibers the desired orientation relative to that line X.

The techniques of braiding, twisting and twisting are known per se and it is within the general knowledge of the person skilled in the art to use them to achieve the desired orientation of the fibers within the strands. The skilled person will however recognize that other methods can be considered to orient the fibers of a strand with respect to its centerline. The methods of braiding, twisting and twining are provided only as examples of methods that may be used. As indicated above, these methods can be combined to produce the strands intended to be woven.

Regardless of the embodiment considered, the strands used to weave the fibrous preform may be formed of carbon fibers or of fibers of a ceramic material different from carbon, such as silicon carbide or alumina, or of glass or polymeric fibers.

The invention is based on having, in the shear plane of the component, a group of strands, each strand of which has fibers forming an angle comprised between 10° and 50° with the centerline of said strand. Regardless of the embodiment considered, at least 10%, for example at least 25%, for example at least 50%, for example at least 75%, for example all of the strands present in the shear plane have fibers forming an angle comprised between 10° and 50° with their centerline.

Different structures for the fibrous preform and the strands constituting it have been described. The rest of the turbomachine component manufacturing process, which includes the densification of the fibrous preform obtained by a matrix, will now be described.

The matrix can be obtained in a manner known per se according to the liquid process. The liquid process consists in impregnating the preform with a liquid composition containing an organic precursor of the matrix material. The organic precursor is usually in the form of a polymer, such as a resin, optionally diluted in a solvent. The fibrous preform is placed in a sealable mold with a housing in the shape of the final molded component.

The transformation of the precursor into a matrix is carried out by heat treatment, generally by heating the mold, after removal of the possible solvent and cross-linking of the polymer, the preform being always maintained in the mold having a shape corresponding to that of the component to be produced.

An epoxy resin can be used to obtain an organic matrix. In the case of forming a carbon or ceramic matrix, the heat treatment involves pyrolyzing the organic precursor to transform the organic matrix into a carbon or ceramic matrix depending on the precursor used and the pyrolysis conditions. By way of example, liquid carbon precursors can be resins with a relatively high coke content, such as phenolic resins, while liquid ceramic precursors, in particular SiC, can be polycarbosilane (PCS) or polytitanocarbosilane (PTCS) or polysilazane (PSZ) type resins. Several consecutive cycles, from impregnation to heat treatment, can be performed to achieve the desired degree of densification.

Other methods can be considered to form the matrix, such as for example chemical vapor infiltration or melt-infiltration. Of course, these different techniques can be combined to form the matrix.

The turbomachine component can be a component made of organic, carbon matrix composite material or of ceramic material different from carbon, such as a carbide or an oxide. The matrix can for example be made of silicon carbide or alumina.

Two examples of turbomachine components that can incorporate the fibrous preform described above as a fibrous reinforcement will now be described.

FIG. 7 illustrates a fan blade 40 that incorporates a fibrous preform described above. The blade 40 comprises a blade body 42 that extends between a root portion 44 and a tip portion 46. The blade 40 has a leading edge BA and a trailing edge BF. A shear plane P of the fan blade 40 has been shown. This plane P corresponds to the plane defined by the height and width of the blade. In the illustrated example, the plane P is defined by the warp CH and weft TR directions. The warp direction CH is oriented along the height of the blade 40 and the weft direction TR along the width of the blade 40. Other shear planes exist such as the height/thickness (warp/thickness) and width/thickness (weft/thickness) planes.

FIG. 8 illustrates an alternative turbomachine component constituted by a fan casing 50 of a gas turbine aircraft engine. Such an engine, as shown schematically in FIG. 8, comprises, from upstream to downstream in the direction of the gas flow, a fan disposed at the inlet of the engine comprising the fan casing 50, a compressor 52, a combustion chamber 54, a high-pressure turbine 56 and a low-pressure turbine 58. In this example, the shear plane P is defined by the circumferential C and axial A directions of the fan casing 50.

According to an alternative, the turbomachine component could be an intermediate casing, i.e., the casing located between the fan casing and the exhaust casing, or the exhaust casing.

Example

A numerical simulation was performed to evaluate the mechanical properties of a 3D woven fibrous preform with an interlock weave from strands formed by braiding elementary strands. The constituent fibers of each of the strands formed an angle of 30° with the centerline of said strand. The elementary strands used were made of T-650 carbon fibers. The simulation showed a very significant gain in the shear modulus in the weave plane (warp/weft plane) of more than 200% compared with the case where the fiber preform was made of strands made of a bundle of unoriented fibers forming an angle of 0° with the centerline. The fiber volume ratio in the considered strands was 72%.

The expression "comprised between . . . and . . . " should be understood as including the bounds.

The invention claimed is:

1. A turbomachine component made of composite material comprising a fibrous reinforcement formed by a fibrous preform, and a matrix densifying the fibrous reinforcement, said fibrous preform having a three-dimensional weave formed by a plurality of woven strands; wherein, in a shear plane of the component, all or part of the strands present in said shear plane have fibers forming an angle comprised between 10° and 50° with their centerline and wherein said shear plane corresponds to the plane defined by warp and weft directions of the three-dimensional weave, or to the plane defined by the warp direction and a thickness direction of the three-dimensional weave, or to the plane defined by the weft direction and the thickness direction of the three-dimensional weave.

2. The component as claimed in claim 1, wherein said angle is comprised between 30° and 50°.

3. The component as claimed in claim 1, wherein the component comprises strands present in said shear plane and extending along a tensile stress direction of the component, said strands having fibers forming an angle less than or equal to 15° with said tensile stress direction.

4. The component as claimed in claim 1, comprising, in a first zone of said shear plane, a first set of warp strands, respectively weft strands, which have fibers forming a first angle comprised between 10° and 50° with their centerline, and, in a second zone of said shear plane different from the first, a second set of warp strands, respectively weft strands, which have fibers forming a second angle with their centerline, said second angle being different from said first angle.

5. The component as claimed in claim 1, wherein the woven strands consist of a braid of elementary strands.

6. The component as claimed in claim 1, wherein the woven strands are formed of carbon fibers or of fibers of a ceramic material different from carbon.

7. The component as claimed in claim 1, wherein the component is a turbomachine blade.

8. The component as claimed in claim 1, wherein the component is a turbomachine casing.

9. A process for manufacturing a component as claimed in claim 1, comprising:
   obtaining a plurality of strands by giving the constituent fibers of each strand an angle comprised between 10° and 50° with the centerline of said strand,
   three-dimensional weaving of the preform using the strands thus obtained, and densifying the preform obtained by the matrix.

10. The process as claimed in claim 9, wherein the strands are obtained by at least one of: braiding elementary strands, twisting elementary strands or twisting fiber bundles.

11. The component as claimed in claim 1, wherein the fibers forming an angle comprise oriented fibers within the strands, and the oriented fibers form the angle with the centerline of the corresponding strand.

* * * * *